United States Patent [19]

Masuko et al.

[11] Patent Number: 5,147,948
[45] Date of Patent: Sep. 15, 1992

[54] METHOD FOR POLYMERIZING VINYL CHLORIDE WHILE INHIBITING ADHESION TO THE POLYMERIZATION REACTOR WITH COATING FROM POLY(HYDRICPHENOL SULFIDE)

[75] Inventors: Seiichi Masuko; Ichisaburo Nakamura; Keiichi Fukuda, all of Osaka; Yasuyuki Hatakeyama, Osaka; Akihiro Yamaguchi, Kanagawa; Keizaburo Yamaguchi, Chiba, all of Japan

[73] Assignee: Mitsui Toatsu Chemicals, Inc., Tokyo, Japan

[21] Appl. No.: 631,932

[22] Filed: Dec. 21, 1990

[30] Foreign Application Priority Data

Dec. 28, 1989 [JP] Japan ................... 1-338206

[51] Int. Cl.$^5$ ................................. C08F 2/20
[52] U.S. Cl. ...................... 526/62; 526/202
[58] Field of Search .................... 526/62, 74

[56] References Cited

U.S. PATENT DOCUMENTS 4,080,173  3/1978  Cohen ................... 526/62
4,297,320 10/1981  Cohen ................... 526/62

FOREIGN PATENT DOCUMENTS

WO80/02388 11/1980 PCT Int'l Appl. .

OTHER PUBLICATIONS

Chemical Abstracts, vol. 106, No. 14, Abstract No. 102706j, pp. 1-2, Apr. 6, 1987.
Chemical Abstracts, vol. 106, No. 10, Abstract No. 67761z, pp. 1-6, Mar. 9, 1987.

*Primary Examiner*—Christopher Henderson
*Attorney, Agent, or Firm*—Burns, Doane, Swecker & Mathis

[57] ABSTRACT

A method for polymerizing vinyl chloride comprises polymerizing vinyl chloride in an aqueous medium or bulk-polymerizing vinyl chloride, wherein the inner wall of a polymerizer and parts of devices which come in contact with the monomer during the polymerization are coated, prior to the polymerization, with a reaction product having a molecular weight ranging from 500 to 100,000, obtained by condensing a polyhydric phenol and sulfur dichloride in the presence of a Lewis acid as a catalyst. The amount of the polymer adhered to the polymerizer during polymerization of vinyl chloride is substantially lowered and the adhered polymer can be easily washed away through simple water washing according to the foregoing method. Moreover, the method does not adversely affect the reaction time and the quality of the resulting product at all.

10 Claims, No Drawings

METHOD FOR POLYMERIZING VINYL CHLORIDE WHILE INHIBITING ADHESION TO THE POLYMERIZATION REACTOR WITH COATING FROM POLY(HYDRICPHENOL SULFIDE)

BACKGROUND OF THE INVENTION

1. Field of the Invention

The present invention relates to an improved method for homopolymerizing or copolymerizing vinyl chloride and more specifically to a method for preventing the adhesion of polymer to the inner wall of a polymerizer or the like during polymerization of vinyl chloride.

2. Description of the Prior Art

When vinyl chloride is homopolymerized Or copolymerized with another monome copolymerizable with vinyl chloride (hereinafter simply referred to as "polymerized or polymerization"), there is observed adhesion of a polymer to portions of devices such as the inner wall of a polymerizer, a reflux condenser, a stirring blade, a baffle and a variety of accessory pipings and/or connections thereof which are brought into contact with the monomers during the polymerization. For this reason, various problems arise. For instance, the cooling capacity of the polymerizer is greatly impaired and the polymer once adhered to these devices and then peeled off is mixed in the resulting homopolymer or copolymer (hereinafter referred to as "product(s)") to thus lower the quality of the products. Therefore, it is a general practice that the subsequent polymerization operation must be started after each polymerization operation is finished and after the polymerizer is cleaned. However, this requires a great deal of labor and time and this in turn results in the reduction of the working ratio of the polymerizer and an increase in the cost of the products.

Under such circumstances, there have been proposed a variety of methods for preventing the adhesion of polymers to the inner wall of polymerizers or other portions through the application of an agent to these portions.

These methods are effective for preventing the adhesion of polymers, but they conversely suffer from a variety of drawbacks such as a decrease in the polymerization speed and deterioration of physical properties of the resulting products. Thus, these methods cannot be satisfied from the industrial standpoint. Moreover, many attempts have been directed to the development of methods which do not impair the polymerization speed and physical properties of the products, but these methods do not likewise provide a satisfied polymer adhesion-inhibitory effect. For instance, there have been proposed methods which comprise applying co-condensate of resorcin and aldehyde (see KOHYO Nos. Sho 57-502169 and Sho 57-502170), but these methods are still insufficient in the polymer adhesion-inhibitory effect.

SUMMARY OF THE INVENTION

Accordingly, an object of the present invention is in general to provide an improved method for polymerizing vinyl chloride and more specifically to provide a method for preventing adhesion of polymers to the inner wall of a polymerizer or the like during polymerization of vinyl chloride.

The inventors of this invention have conducted various studies to solve the foregoing problems associated with the conventional methods for polymerizing vinyl chloride in the presence or absence of other monomers copolymerizable with vinyl chloride, as a result have found out that the foregoing drawbacks can effectively be eliminated by applying a specific polymer to portions which come in contact with the monomers during the polymerization and have thus completed the present invention.

The foregoing object of the present invention can be effectively achieved by providing a method for polymerizing vinyl chloride which comprises polymerizing vinyl chloride in an aqueous medium or bulk-polymerizing vinyl chloride and which is characterized in that the inner wall of a polymerizer and parts of devices which come in contact with the monomer during the polymerization are coated, prior to the polymerization, with a reaction product having a molecular weight ranging from 500 to 100,000 obtained by condensing a polyhydric phenol and sulfur dichloride in the presence of a Lewis acid as a catalyst.

DESCRIPTION OF THE PREFERRED EMBODIMENTS

The coating agent used in the present invention is a reaction product of a polyhydric phenol and sulfur dichloride which is represented by the following general formula (I):

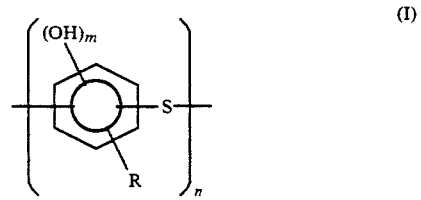

(wherein R represents a hydrogen atom or a lower alkyl group having 1 to 4 carbon atoms; m is an integer of 2 or 3 and n represents an integer ranging from 4 to 700).

The term "polyhydric phenol" herein means, for instance, bivalent phenols such as catechol, hydroquinone and resorcin; trivalent phenols such as pyrogallol, hydroxyhydroquinone and fluoroglycine; and derivatives thereof such as 2-methylresorcin, 4-methylresorcin, 4-methylcatechol, 2-methylhydroquinone, 2-ethylresorcin, 4-tert-butylresorcin, 4-isopropylcatechol and 1,2,3-trihydroxy-5-methylbenzene, but the present invention is not restricted to these specific examples.

Sulfur dichloride can be obtained by passing gaseous chlorine through powdery sulfur.

Moreover, catalysts used in the method of this invention are Lewis acids and specific examples thereof include zinc chloride, aluminum chloride and tin chloride.

The amount of sulfur dichloride preferably ranges from 0.5 to 2.5 moles per mole of the polyhydric phenol used and it is more preferably 1.0 to 2.0 moles because high yield can be expected. The reaction temperature is not critical, but in general ranges from 0 to 40° C. In addition, the reaction solvents may be any general purpose solvents inert to the reaction and typical examples thereof include, but by no means are limited to, benzene, toluene, methylene chloride, dichloroethane, chlorobenzene, tetrahydrofuran, ethyl ether and diethylene glycol dimethyl ether. It is sufficient to use these solvents in an amount of 1 to 20 times and preferably 2 to 10 times the weight of the starting materials used.

The molecular weight of the reaction product of the polyhydric phenol and sulfur dichloride preferably ranges from 500 to 100,000 and more preferably 1,000 to 50,000.

There has not yet been clearly elucidated the reason why the adhesion of polymers to the inner wall of the polymerizer and parts of devices which come in contact with monomers can effectively be prevented according to the method of this invention, but it can be thought that the hydroxyl groups existing on the side chains of the reaction product of a polyhydric phenol and sulfur dichloride have an ability of uptaking radicals generated during the polymerization and thus serve to inhibit the polymerization of vinyl chloride which possibly takes place on the surface.

In practicing the method of the present invention, the reaction product of a polyhydric phenol and sulfur dichloride is preferably applied to the inner wall of the polymerizer or the like in the form of an aqueous solution thereof, but it is also possible to apply it in the form of a solution in an organic solvent.

(1) When it is used as a solution in an organic solvent

The reaction product is dissolved in an organic solvent so that the organic solution has a solids content of 0.05 to 5% by weight. The solution is applied onto the desired surface and then dried. Such organic solvents may be those which can dissolve the foregoing reaction product and do not exert any influence on the polymerization reaction and the physical properties of the resulting polymer. Examples of such organic solvents which can preferably used in the invention are tetrahydrofuran, dioxane, methanol, ethanol, acetone, chloroform and mixtures thereof.

(2) When it is used in the form of an aqueous solution

The reaction product is dissolved in an aqueous solution containing 0.1 to 5% by weight of an alkali metal hydroxide so that the solids content of the resultant aqueous solution is equal to 0.1 to 10% by weight and then the pH thereof is adjusted to 8 to 3 with an inorganic or organic acid prior to use.

The application thereof to the inner wall of the polymerizer or the like can be performed at ordinary temperature. The aqueous solution may be applied to the wall surface or the like when it is still in wet condition and the surface or the like is washed with water within 5 minutes after the application. The alkali metal hydroxide for solubilizing the reaction product is generally or preferably sodium hydroxide.

Examples of inorganic or organic acids for adjusting the pH value of the aqueous solution are hydrochloric acid, sulfuric acid, phosphoric acid, nitric acid, ascorbic acid, acetic acid, citric acid and mercaptopropionic acid.

In either of the foregoing two cases (1) and (2), it is necessary, in the method of the present invention, to apply the reaction product of a polyhydric phenol and sulfur dichloride to the wall of the devices and the polymerizer by any means such as a coating method. The coating can generally be performed according to a brush coating or spray coating method. The amount of the product to be applied is not limited to a particular level, but in general ranges from 0.005 to 10 g/m², preferably 0.01 to 5 g/m².

The coating may be performed prior to every batch polymerization, or after the application thereof, the polymerization operations over several batches may be continuously performed with a simple water washing between two successive polymerization operations.

The method of the present invention can effectively be applied to not only homopolymerization of vinyl chloride, but also copolymerization thereof with another monomer copolymerizable with vinyl chloride such as an olefin (e.g., ethylene or propylene); a vinyl monomer (for instance, vinyl acetate or styrene); an acrylic monomer (e.g., acrylonitrile or an acrylic acid ester); and a dicarboxylic acid monomer (e.g., maleic acid, a maleic acid ester, fumaric acid or a fumaric acid ester). These monomers copolymerizable with vinyl chloride may be used in an amount of not more than 20% by weight on the basis of the weight of vinyl chloride used.

Alternatively, the method of the present invention may further be applied to aqueous suspension polymerization and aqueous emulsion polymerization of the foregoing monomers as well as so-called bulk polymerization of the foregoing monomers in which a polymerization medium is not employed or the monomer used per se serves as a polymerization medium, under the usual polymerization conditions.

As has been explained above in detail, the method of the present invention makes it possible to substantially reduce the adhesion of polymers to the surface of a polymerizer and other devices for polymerizing vinyl chloride and also to remove a small amount of polymers adhered thereto through a simple water-washing operation. In addition, the method does not adversely affect the polymerization speed and the quality of the resulting product.

The method of the present invention will hereunder be explained in more detail with reference to the following non-limitative working Examples and Preparation Examples and the effects practically achieved by the present invention will also be discussed in comparison with Comparative Examples.

PREPARATION EXAMPLE 1

Coating Solution 1

To a reactor provided with a thermometer and a stirring machine, there were added 55 g (0.5 mole) of resorcin, 0.5 g (0.004 mole) of anhydrous zinc chloride and 150 ml of methylene chloride and the mixture was dissolved with stirring. The solution was ice-cooled to maintain the temperature of the contents at 0 to 5° C. while 41.2 g (0.4 mole) of sulfur dichloride was dropwise added to the solution over 5 hours. The hydrogen chloride gas generated during the reaction was discharged out of the reaction system. Granular precipitates were formed in the course of the dropwise addition, but the stirring was continued without any treatment. After completion of the dropwise addition, the system was ripened for 7 hours to finish the reaction.

After completion of the reaction, the precipitates were separated by filtration, washed with hot water, dried and pulverized to give a yellow powdery product. The yield and the average molecular weight thereof were 29 g and about 1,000 respectively.

The yellow powdery product was dissolved in methanol so that the solids content of the resulting solution was 0.4% by weight.

PREPARATION EXAMPLE 2

Coating Solution 2

The yellow powdery product of Preparation Example 1 was dissolved in a 0.8% by weight aqueous solution of NaOH so that the solids content of the resulting solution was 2% by weight and then ascorbic acid was added to adjust the pH thereof to 7.0.

PREPARATION EXAMPLE 3

Coating Solution 3

To a reactor provided with a thermometer and a stirring machine, there were added 55 g (0.5 mole) of resorcin, 0.5 q (0.004 mole) of anhydrous zinc chloride and 200 ml of tetrahydrofuran and the mixture was dissolved with stirring. The solution was ice-cooled to maintain the temperature of the contents at 5 to 10° C. while 77.3 g (0.75 mole) of sulfur dichloride was dropwise added to the solution over 7 hours. The hydrogen chloride gas generated during the reaction was discharged out of the reaction system. After completion of the dropwise addition, the system was stirred at room temperature for 12 hours to complete the reaction. When the resulting yellow viscous liquid was diluted with 1 l of water, it separated into two phases. The lower phase, i.e., the yellow oily phase was separated, dried in vacuo and then pulverized to give a yellow powdery product. The yield and the average molecular weight thereof were 80 g and about 4,000 respectively.

The yellow powdery product was dissolved in methanol so that the solids content of the resulting solution was 0.4% by weight.

PREPARATION EXAMPLE 4

Coating Solution 4

The yellow powdery product of Preparation Example 3 was dissolved in a 0.5% by weight aqueous solution of NaOH so that the solids content of the resulting solution was 2% by weight and then citric acid was added to adjust pH thereof to 4.0.

PREPARATION EXAMPLE 5

Coating Solution 5

The same procedures used in Preparation Example 3 except that pyrogallol and sulfur dichloride were reacted in a molar ratio of 1:1. The reaction product had an average molecular weight of 2,800. The resin was dissolved in a 0.5% by weight NaOH aqueous solution so that the solids content of the resulting solution was equal to 2% by weight and then phosphoric acid was added to adjust the pH thereof to 7.0.

PREPARATION EXAMPLE 6

Coating Solution 6

The same procedures used in Preparation Example 3 except that 4-methylresorcin and sulfur dichloride were reacted in a molar ratio of 1.0:1.2. The reaction product had an average molecular weight of 4,050. The resin was dissolved in a 0.6% by weight NaOH aqueous solution so that the solids content of the resulting solution was equal to 2% by weight and then hydrochloric acid was added to adjust the pH thereof to 6.0.

EXAMPLE 1

The coating solution 1 obtained in Preparation Example was sprayed onto the inner wall of a 7 l inner volume polymerizer of stainless steel with a spraying machine and then the methanol was evaporated under reduced pressure.

After such a treatment, there were introduced, into the polymerizer, 3,000 g of deionized water, 0.6 g of t-butylperoxypivalate and 2 g of partially saponified polyvinyl alcohol having a degree of saponification of 80% and the air present in the polymerizer was removed with a vacuum pump. Thereafter, 2,000 g of vinyl chloride was introduced into the polymerizer and the reaction was continued at 57° C. until the pressure reached 5 kg/cm$^2$G.

After completion of the reaction, the unreacted monomer was recovered, the remaining polymer slurry was discharged, the inner surface of the polymerizer was rinsed with water and then dried. Subsequently, the coating solution was again applied onto the inner surface of the polymerizer, then the methanol was evaporated under reduced pressure and the secondary charge was introduced to carry out polymerization. The foregoing polymerization operations were repeated four times. After each polymerization operation, the weight of the polymer adhered to the inner wall of the polymerizer was determined. Moreover, the resulting polymer slurries were dehydrated and dried to give polymer products whose physical properties were also determined. The results thus obtained are summarized in the following Table 1.

COMPARATIVE EXAMPLE 1

The same procedures used in Example 1 were repeated only one time except that the coating solution was not applied onto the inner wall of the polymerizer. As a result, it was found that a very large amount of the polymer was adhered to the inner wall as will be seen from the following Table 1 and subsequent Tables given below.

EXAMPLE 2

The coating solution 2 obtained in Preparation Example 2 was sprayed on to the inner wall of a 7 l inner volume polymerizer of stainless steel with a spraying machine and immediately after the spraying, the coated film was rinsed with water.

After such a treatment, polymerization tests were carried out in the same manner as used in Example 1. After completion of the reaction, the unreacted monomer was recovered, the remaining polymer was discharged, the inner surface of the polymerizer was rinsed with water, the coating solution was again applied onto the inner surface of the polymerizer, immediately thereafter the coated film was rinsed. Then the secondary charge was introduced to carry out polymerization. The foregoing polymerization operations were repeated four times.

After each polymerization operation, the weight of the polymer adhered to the inner wall of the polymerizer was determined. Moreover, the resulting polymer slurries were dehydrated and dried to give polymer products whose physical properties were also determined according to the methods as will be described below in connection with Table 1.

As seen from Table 2, the amount of the polymer adhered to the inner wall was markedly lowered according to the present invention and further the adhered polymer could be easily washed away through simple water washing.

The reaction time was short and the physical properties of the resulting product were also excellent.

EXAMPLE 3

With the coating solution 3 obtained in Preparation Example 3, the same procedures used in Example 1 were repeated. The results obtained are listed in Table 3. As seen from Table 3, it was found that the amount of the polymer adhered was substantially lowered and that the adhered polymer could be easily washed away through simple water washing according to the method of the present invention. The reaction time was short and the physical properties of the resulting produce were also excellent.

EXAMPLE 4

With the coating solution 4 obtained in Preparation Example 4, the same procedures used in Example 3 were repeated. The results obtained are summarized in Table 4. As seen from Table 4, it was found that the amount of the polymer adhered was substantially lowered and that the adhered polymer could be easily washed away through simple water washing according to the method of the present invention. The reaction time was short and the physical properties of the resulting product were also excellent.

EXAMPLE 5

The same procedures used in Example 2 were repeated except that the coating solution 5 obtained in Preparation Example 5 was used. The results obtained are listed in Table 5. As seen from the results listed in Table 5, it was found that the amount of the polymer adhered was substantially lowered and that the adhered polymer could be easily washed away through simple water washing according to the method of the present invention. The reaction time was short and the physical properties of the resulting product were also excellent.

EXAMPLE 6

The same procedures used in Example 2 were repeated except that the coating solution 6 obtained in Preparation Example 6 was used. The results obtained are listed in Table 6.

Test Methods

The physical properties of the products obtained in the foregoing Examples were determined according to the following methods: (1) Average Degree of Polymerization: This is determined according to JIS.K-6721 (2) Apparent Specific Gravity: This is determined according to JIS.K-6721 (3) Fish Eye: Each product was mixed with desired amounts of a PVC plasticizer, a heat stabilizer or the like, the mixture was roll-milled at 150° C. for 5 min and formed into a sheet. Then the number of fish eyes present on an area of $10 \times 10$ cm was determined according to the usual manner. (4) Porosity: This is determined according to the mercury injection method.

TABLE 1

| Ex. No. | Comparative Example No. 1 | Example No. 1 | Example No. 1 | Example No. 1 | Example No. 1 |
|---|---|---|---|---|---|
| No. of Polymerization | 1 | 1 | 2 | 3 | 4 |
| Amount Coated (g/m$^2$) | — | 0.1 | 0.1 | 0.1 | 0.1 |
| Reaction time (hr) | 11.0 | 11.1 | 11.1 | 11.0 | 10.9 |
| Amount of Polymer Adhered (g/m$^2$) | 45 | 0.3 | 0.5 | 0.4 | 0.5 |
| Average Degree of Polymerization | 1050 | 1050 | 1040 | 1050 | 1050 |
| Apparent Density (g/ml) | 0.520 | 0.518 | 0.517 | 0.520 | 0.522 |
| Particle Size Distribution | | | | | |
| ≧60 mesh | 0 | 0 | 0 | 0 | 0 |
| 61 to 100 mesh | 37 | 38 | 39 | 38 | 36 |
| 101 to 200 mesh | 60 | 61 | 59 | 61 | 62 |
| ≦200 mesh | 3 | 2 | 1 | 1 | 2 |
| Number of Fish Eyes | 5 | 5 | 6 | 4 | 5 |
| Porosity (% by volume) | 25.3 | 25.5 | 25.6 | 25.2 | 25.5 |

TABLE 2

| Ex. No. | Comparative Example No. 1 | Example No. 2 | Example No. 2 | Example No. 2 | Example No. 2 |
|---|---|---|---|---|---|
| No. of Polymerization | 1 | 1 | 2 | 3 | 4 |
| Amount Coated (g/m$^2$) | — | 1.0 | 1.0 | 1.0 | 1.0 |
| Reaction time (hr) | 11.0 | 10.9 | 11.0 | 11.1 | 11.1 |
| Amount of Polymer Adhered (g/m$^2$) | 45 | 0.4 | 0.5 | 0.3 | 0.5 |
| Average Degree of Polymerization | 1050 | 1040 | 1050 | 1060 | 1050 |
| Apparent Density (g/ml) | 0.520 | 0.519 | 0.521 | 0.520 | 0.521 |
| Particle Size Distribution | | | | | |
| ≧60 mesh | 0 | 0 | 0 | 0 | 0 |
| 61 to 100 mesh | 37 | 39 | 38 | 37 | 36 |
| 101 to 200 mesh | 60 | 58 | 58 | 59 | 60 |
| ≦200 mesh | 3 | 3 | 4 | 4 | 4 |
| Number of Fish Eyes | 5 | 6 | 5 | 4 | 5 |
| Porosity (% by volume) | 25.3 | 25.6 | 25.5 | 25.3 | 25.4 |

TABLE 3

| Ex. No. | Comparative Example No. 1 | Example No. 3 | Example No. 3 | Example No. 3 | Example No. 3 |
|---|---|---|---|---|---|
| No. of Polymerization | 1 | 1 | 2 | 3 | 4 |
| Amount Coated (g/m$^2$) | — | 0.1 | 0.1 | 0.1 | 0.1 |
| Reaction time (hr) | 11.0 | 11.1 | 11.0 | 10.9 | 11.1 |

TABLE 3-continued

| Ex. No. | Comparative Example No. 1 | Example No. 3 | Example No. 3 | Example No. 3 | Example No. 3 |
|---|---|---|---|---|---|
| Amount of Polymer Adhered (g/m$^2$) | 45 | 0.4 | 0.5 | 0.3 | 0.2 |
| Average Degree of Polymerization | 1050 | 1060 | 1050 | 1050 | 1040 |
| Apparent Density (g/ml) | 0.520 | 0.522 | 0.521 | 0.522 | 0.520 |
| Particle Size Distribution | | | | | |
| ≧60 mesh | 0 | 0 | 0 | 0 | 0 |
| 61 to 100 mesh | 37 | 39 | 38 | 37 | 40 |
| 101 to 200 mesh | 60 | 58 | 58 | 58 | 57 |
| ≦200 mesh | 3 | 3 | 4 | 5 | 3 |
| Number of Fish Eyes | 5 | 4 | 5 | 4 | 5 |
| Porosity (% by volume) | 25.3 | 25.4 | 25.5 | 25.3 | 25.6 |

TABLE 4

| Ex. No. | Comparative Example No. 1 | Example No. 4 | Example No. 4 | Example No. 4 | Example No. 4 |
|---|---|---|---|---|---|
| No. of Polymerization | 1 | 1 | 2 | 3 | 4 |
| Amount Coated (g/m$^2$) | — | 1.0 | 1.0 | 1.0 | 1.0 |
| Reaction time (hr) | 11.0 | 11.0 | 10.9 | 11.1 | 11.2 |
| Amount of Polymer Adhered (g/m$^2$) | 45 | 0.3 | 0.2 | 0.4 | 0.2 |
| Average Degree of Polymerization | 1050 | 1040 | 1050 | 1060 | 1060 |
| Apparent Density (g/ml) | 0.520 | 0.521 | 0.521 | 0.519 | 0.522 |
| Particle Size Distribution | | | | | |
| ≧60 mesh | 0 | 0 | 0 | 0 | 0 |
| 61 to 100 mesh | 37 | 38 | 38 | 37 | 39 |
| 101 to 200 mesh | 60 | 58 | 57 | 59 | 56 |
| ≦200 mesh | 3 | 4 | 5 | 4 | 5 |
| Number of Fish Eyes | 5 | 5 | 4 | 5 | 6 |
| Porosity (% by volume) | 25.3 | 25.4 | 25.2 | 25.3 | 25.5 |

TABLE 5

| Ex. No. | Comparative Example No. 1 | Example No. 5 | Example No. 5 | Example No. 5 | Example No. 5 |
|---|---|---|---|---|---|
| No. of Polymerization | 1 | 1 | 2 | 3 | 4 |
| Amount Coated (g/m$^2$) | — | 1.0 | 1.0 | 1.0 | 1.0 |
| Reaction time (hr) | 11.0 | 11.1 | 11.2 | 10.9 | 11.2 |
| Amount of Polymer Adhered (g/m$^2$) | 45 | 0.2 | 0.3 | 0.4 | 0.3 |
| Average Degree of Polymerization | 1050 | 1040 | 1060 | 1050 | 1040 |
| Apparent Density (g/ml) | 0.520 | 0.519 | 0.522 | 0.523 | 0.510 |
| Particle Size Distribution | | | | | |
| ≧60 mesh | 0 | 0 | 0 | 0 | 0 |
| 61 to 100 mesh | 37 | 37 | 38 | 39 | 38 |
| 101 to 200 mesh | 60 | 59 | 59 | 56 | 58 |
| ≦200 mesh | 3 | 4 | 3 | 5 | 4 |
| Number of Fish Eyes | 5 | 4 | 5 | 6 | 5 |
| Porosity (% by volume) | 25.3 | 25.2 | 25.4 | 25.5 | 25.3 |

TABLE 6

| Ex. No. | Comparative Example No. 1 | Example No. 6 | Example No. 6 | Example No. 6 | Example No. 6 |
|---|---|---|---|---|---|
| No. of Polymerization | 1 | 1 | 2 | 3 | 4 |
| Amount Coated (g/m$^2$) | — | 1.0 | 1.0 | 1.0 | 1.0 |
| Reaction time (hr) | 11.0 | 11.1 | 10.9 | 11.2 | 11.1 |
| Amount of Polymer Adhered (g/m$^2$) | 45 | 0.3 | 0.4 | 0.5 | 0.4 |
| Average Degree of Polymerization | 1050 | 1040 | 1060 | 1050 | 1060 |
| Apparent Density (g/ml) | 0.520 | 0.522 | 0.521 | 0.522 | 0.521 |
| Particle Size Distribution | | | | | |
| ≧60 mesh | 0 | 0 | 0 | 0 | 0 |
| 61 to 100 mesh | 37 | 38 | 37 | 39 | 37 |
| 101 to 200 mesh | 60 | 59 | 59 | 56 | 59 |
| ≦200 mesh | 3 | 3 | 4 | 5 | 4 |
| Number of Fish Eyes | 5 | 4 | 5 | 6 | 6 |
| Porosity (% by volume) | 25.3 | 25.4 | 25.5 | 25.6 | 25.4 |

As has been described above in detail, the amount of the polymer adhered to the polymerizer during polymerization of vinyl chloride is substantially lowered and the adhered polymer can be easily washed away through simple water washing according to the method of the present invention. Moreover, the method does not adversely affect the reaction time and the quality of the resulting product at all.

What is claimed is:

1. A method for polymerizing vinyl chloride which comprises polymerizing vinyl chloride in an aqueous medium wherein the inner wall of a polymerizer and parts of devices which come in contact with the monomer during the polymerization are coated, prior to the polymerization, with a reaction product having a molecular weight ranging from 500 to 100,000 obtained by condensing a polyhydric phenol and sulfur dichloride in the presence of a Lewis acid as a catalyst, said reaction product being represented by the following general formula:

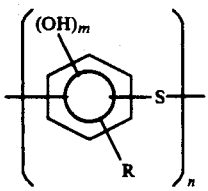

wherein R represents a hydrogen atom or a lower alkyl group having 1 to 4 carbon atoms; m is an integer of 2 or 3; and n is an integer ranging from 4 to 700.

2. The method of claim 1 wherein the application of the reaction product is performed before each polymerization operation.

3. The method of claim 1 wherein the amount of sulfur dichloride ranges from 0.5 to 2.5 moles per mole of the polyhydric phenol.

4. The method of claim 3 wherein the amount of sulfur dichloride ranges from 1.0 to 2.0 moles per mole of the polyhydric phenol.

5. The method of claim 1 wherein the molecular weight of the reaction produce ranges from 1,000 to 50,000.

6. The method of claim 1 wherein the reaction product is dissolved in an alkali metal hydroxide aqueous solution so that the solid content of the solution is equal to 0.1 to 10% by weight, then the pH value of the solution is adjusted to 8 to 3 and the resulting solution is applied onto the inner wall of the polymerizer and the parts of the devices which come in contact with the monomer during the polymerization.

7. The method of claim 1 wherein the reaction product is dissolved in an organic solvent so that the solids content of the solution is equal to 0.05 to 5% by weight, the solution is applied onto the inner w 11 of the polymerizer and the parts of the devices which come in contact with the monomer during the polymerization and then dried.

8. The method of claim 1 wherein the reaction product is applied onto the inner wall of the polymerizer and the parts of the devices which come in contact with the monomer during the polymerization in an amount ranging from 0.005 to 10 $g/m^2$ expressed in terms of the solid content.

9. The method of claim 8 wherein the reaction product is applied onto the inner wall of the polymerizer and the parts of the devices which come in contact with the monomer during the polymerization in an amount ranging from 0.01 to 5 $g/m^2$ expressed in terms of the solids content.

10. The method of claim 1 wherein after the application of the reaction product, the polymerization operation over several batches are performed with water washing between every two successive polymerization operations.

* * * * *

UNITED STATES PATENT AND TRADEMARK OFFICE
CERTIFICATE OF CORRECTION

PATENT NO. : 5,147,948
DATED : September 15, 1992
INVENTOR(S) : Masuko et al.

It is certified that error appears in the above-identified patent and that said Letters Patent is hereby corrected as shown below:

In column 11, line 32, delete "produce" and insert therefor --product--.

In column 12, line 12, delete "w 11" and insert therefor --wall--;

Signed and Sealed this

Twenty-eighth Day of December, 1993

Attest:

BRUCE LEHMAN

Attesting Officer  Commissioner of Patents and Trademarks